(12) United States Patent
Lysen

(10) Patent No.: US 7,119,901 B2
(45) Date of Patent: Oct. 10, 2006

(54) DEVICE FOR MEASUREMENT OF MACHINE TOOLS

(75) Inventor: Heinrich Lysen, Garching (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 131 days.

(21) Appl. No.: 10/671,607

(22) Filed: Sep. 29, 2003

(65) Prior Publication Data

US 2004/0070762 A1 Apr. 15, 2004

(51) Int. Cl.
*G01B 11/00* (2006.01)

(52) U.S. Cl. .................................................. 356/399
(58) Field of Classification Search ................ 356/153, 356/138, 155

See application file for complete search history.

(56) References Cited

U.S. PATENT DOCUMENTS

| | | | |
|---|---|---|---|
| 4,889,425 A | 12/1989 | Edwards et al. | |
| 5,302,833 A * | 4/1994 | Hamar et al. | 250/559.3 |
| 5,307,368 A | 4/1994 | Hamar | |
| 5,576,780 A | 11/1996 | Yancey | |
| 5,715,609 A | 2/1998 | Nower | |
| 5,838,430 A | 11/1998 | Slater et al. | |
| 6,023,337 A * | 2/2000 | Schiff | 356/400 |
| 6,356,348 B1 | 3/2002 | Lysen et al. | |
| 6,476,914 B1 | 11/2002 | Hoelzl et al. | |
| 2001/0006420 A1 | 7/2001 | Kato | |
| 2002/0044284 A1 | 4/2002 | Webb | |

OTHER PUBLICATIONS

Grundlagen Der Wzm, Prof. Dr.-Ing. Berend Denkena, Hannover, Sep. 2002, p. 42.

* cited by examiner

Primary Examiner—Gregory J. Toatley, Jr.
Assistant Examiner—Isiaka O. Akanbi
(74) Attorney, Agent, or Firm—David S. Safran

(57) ABSTRACT

At least two identical combined transmitter/receivers are used to perform a measurement task to be carried out. Each combined transmitter/receiver utilizes a combined exit/entrance window. The identical configuration of the transmitter/receiver yields major cost advantages in the production of these articles.

7 Claims, 2 Drawing Sheets

DEVICE FOR MEASUREMENT OF MACHINE TOOLS

BACKGROUND OF THE INVENTION

1. Field of the Invention

The invention relates to a device for precision measurement of machine tools.

2. Description of Related Art

The conventional measurement of machine tools uses, among other measurement devices, optical measurement means that measure based upon interferometry, and are, therefore, comparatively expensive.

SUMMARY OF THE INVENTION

An object of the invention is to provide a measurement tool that is equally suited, in qualitative terms, for precision measurements, that is simpler to use and that is distinctly more favorable with regard to expense and production costs.

This object is achieved with a device for measuring machine tools, that comprises a housing, a power supply, a clamping cylinder or pin, a light beam transmitter for producing a light beam, a beam splitter, a combined exit/entrance window, and an optoelectronic target which can be read out two-dimensionally.

In accordance with an exemplary embodiment of the present invention, at least two combined transmitter/receivers are provided that are identical structurally and employed to perform a measurement task to be carried out on a machine tool. The identical configuration of the transmitter/receiver yields major cost advantages during the production phase of these articles.

The present invention is described in greater detail below with reference to the accompanying drawings.

DETAILED DESCRIPTION OF THE INVENTION

Figure 1:
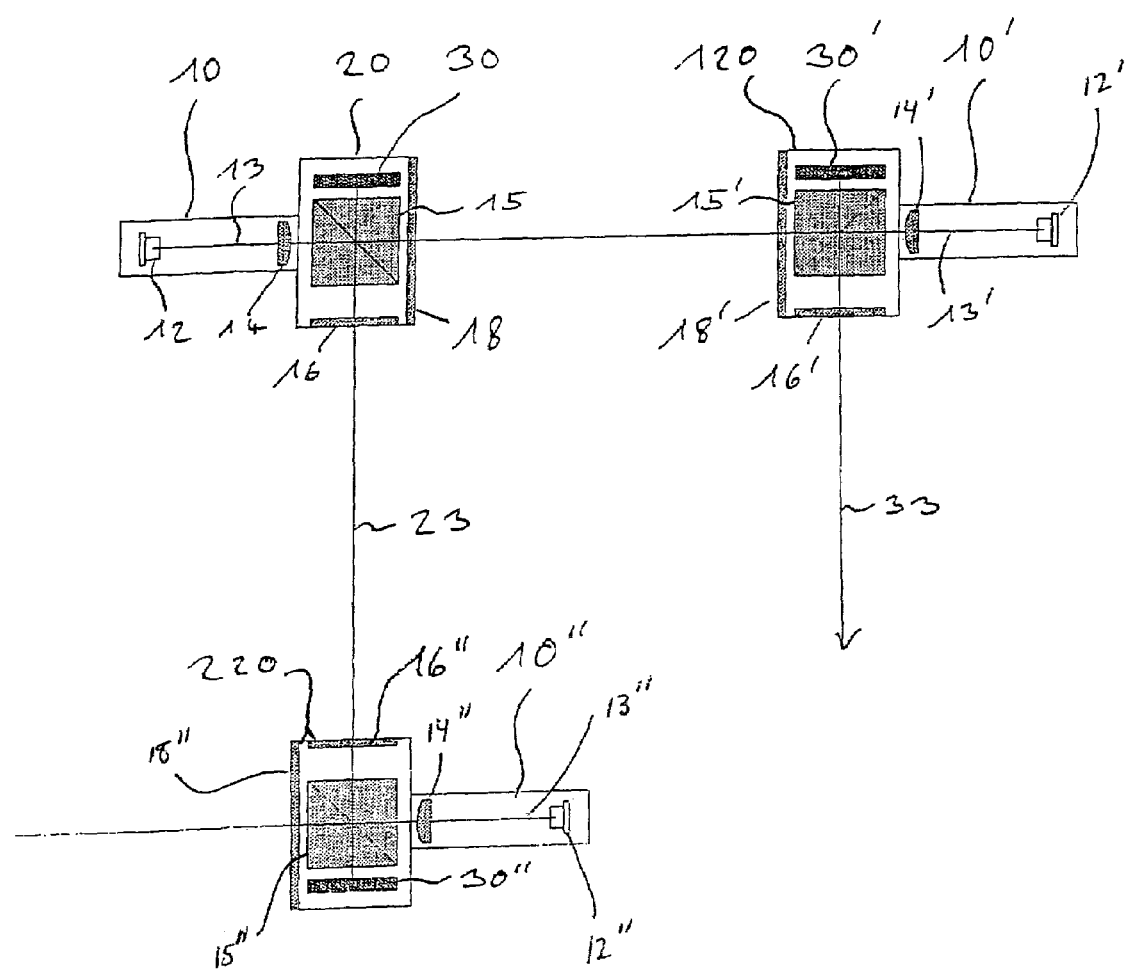
FIG. 1 is a schematic plan view of a device for measurement of machine tools in accordance with an exemplary embodiment of the present invention.

As illustrated in the figure, the present invention comprises several transmitter/receivers 20, 120, 220, that have a housing that is equipped on one side with a Morse cone or a clamping cylinder 10, 10', 10". Through use of the Morse cone or clamping cylinder, the transmitter/receivers 20, 120, 220 can be held or clamped onto a spindle of a machine tool (not illustrated). Additionally, a battery-operated power supply (not shown), a light emitting or laser diode 12, 12' and 12" and collimation optics 14, 14' and 14" are advantageously provided within the clamping cylinder 10, 10', 10". With these components, a narrowly masked light beam (e.g., a laser beam) can be produced. Laser beam 13, 13', 23, 33, produced in this manner, can be used to illuminate an electronic target 30, 30', 30", which can be read out two-dimensionally. The signals delivered from such a target based upon the laser beam's illumination, therefore, represents the incidence site of the laser beam and can be used to perform various two-dimensional measurements of the machine tool.

If, in accordance with an exemplary embodiment of the invention, two transmitter/receivers 20, 120 are each held by several spindles of a like number of machine tools, only with completely aligned and precision-guided machine tools will a laser beam 13, which has been generated by a laser diode 12 hit the center of the target 30' through the first beam splitter or splitter mirror 15 and the second splitter mirror 15'. The same applies to the laser beam 13' produced by the other laser diode and its impact point on the target 30. Ideally, the two laser beams would coincide. Deviations are registered by participating sensors of the target based upon providing a read out of two coordinates at a time with high precision in the submicron range. Deviations can be detected both with respect to the parallel offset of the spindles and also for the angular offset of the spindles.

The incidence of outside light on the target 30, 30' is reduced by filter windows 18, 18' which are matched to the wavelength range of the laser light that is employed.

As is shown in the bottom part of the figure, by providing another filter window 16, 16", the measurement device, in accordance with another exemplary embodiment of the invention, can be used in a much more versatile manner. For example, this measure makes it possible to additionally check the kinematics of another spindle (e.g., with the addition of yet another transmitter/receiver 220) and the possibility of a direction of movement for a tool. In this manner, light beams can be advantageously used as measurement points that hit pertinent different targets.

These measurement devices, in accordance with yet another exemplary embodiment of the invention, can be pushed, tilted or turned in all axes of space relative to one another in a diverse manner to perform the intended measurement task.

Figure 2:
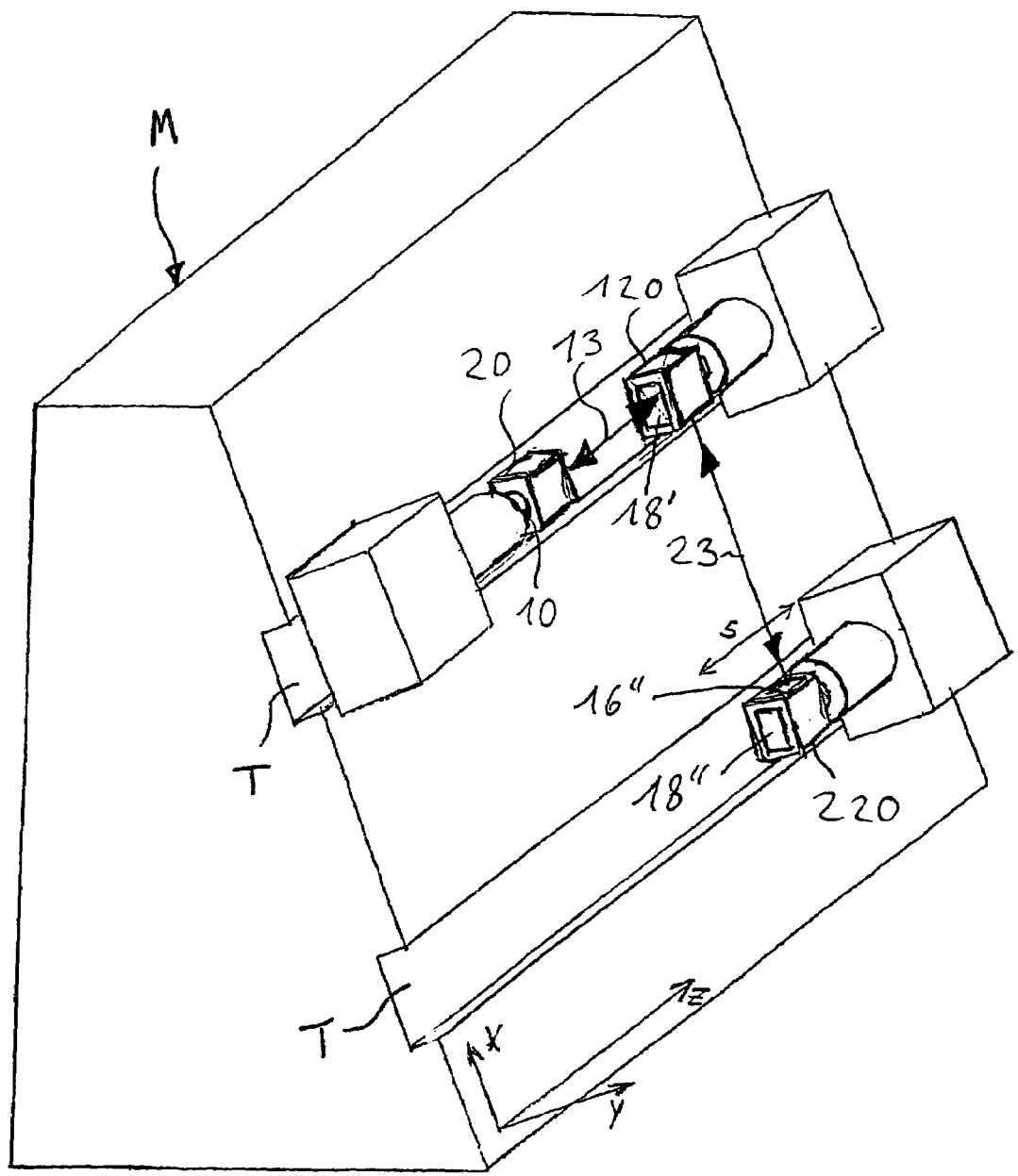
FIG. 2 shows mounting of the device of the present invention on a machine tool.

FIG. 2 shows mounting of the device of FIG. 1 on a machine tool M having tracks T in each of which a pair of spindles (not shown) are movable.

What is claimed is:

1. Device for measuring machine tools, comprising
    a housing with at least one exit/entrance window which enable light beams to pass in and out of the housing,
    a power supply,
    a clamping cylinder or pin on said housing for securing the housing on a machine tool,
    a light beam transmitter for producing a light beam,
    a beam splitter in said housing, and
    an optoelectronic target in said housing, said target having a two-dimensional read-outs,
    wherein said at one exit window comprises first and second exit/entrance windows, each of which is at a different side of said beam splitter from each other and said light beam transmitter, wherein the first and second exit/entrance windows are located at sides of the housing which are at right angles relative to each other.

2. Device as claimed in claim 1, wherein said windows are filter windows and are matched to the wavelength of light emitted by said light beam transmitter.

3. Device as claimed in claim 2, wherein said light beam transmitter is a laser.

4. A system for measuring machine tools, comprising:
    a first transmitter/receiver having a housing that is mountable on a first machine tool;
    a second transmitter/receiver, identical to said first transmitter/receiver, that is mountable on a second machine tool, and
    a third transmitter/receiver, identical to said first transmitter/receiver, that is mountable on a third machine tool wherein each said transmitter/receiver is operable for transmitting a light beam to at least one other of the transmitter/receivers and for receiving a light beam from at least one other of the transmitter/receivers for performing alignment measurements of said machine tools based on the positional relationship of the impact points of the light beams in each transmitter/receiver.

5. A system for measuring machine tools according to claim 4, wherein each transmitter/receiver comprises:
a housing wit two combined exit/entrance windows which enable light beams to pass in and out of the housing,
a light beam transmitter for producing a light beam,
a beam splitter in said housing, and
an optoelectronic target in said housing, said target having a two-dimensional read-out,
wherein each of said combined exit/entrance windows is at a different side of said beam splitter from each other and said light beam transmitter.

6. A method for measuring alignment of machine tools, comprising:

sending a first beam from a first transmitter/receiver located on a first machine tool to a second transmitter/receiver located on a second machine tool and to a target on the first machine tool;
sending a second beam from said second transmitter/receiver to said first transmitter/receiver and to a target on the second machine tool;
sending a third beam from a third transmitter/receiver to said second transmitter/receiver and to a target on the third machine tool;
obtaining deviations of impact points of said first, second and third beams from the target located in each of the first, second and third transmitter receivers; and
using the deviations obtained for determining an offset of spindles of the machine tools.

7. Device as claimed in claim 5, wherein the first and second exit/entrance windows are located at sides of the housing which are at right angles relative to each other.

* * * * *